(12) United States Patent
Bolle et al.

(10) Patent No.: US 8,520,051 B2
(45) Date of Patent: Aug. 27, 2013

(54) VIDEOCONFERENCING TERMINAL WITH A PERSISTENCE OF VISION DISPLAY AND A METHOD OF OPERATION THEREOF TO MAINTAIN EYE CONTACT

(75) Inventors: Cristian A. Bolle, Bridgewater, NJ (US); Gang Chen, Westfield, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 922 days.

(21) Appl. No.: 12/640,998

(22) Filed: Dec. 17, 2009

(65) Prior Publication Data

US 2011/0149012 A1  Jun. 23, 2011

(51) Int. Cl.
*H04N 7/15* (2006.01)
*H04M 11/00* (2006.01)
*B60Q 1/00* (2006.01)
*G01N 21/00* (2006.01)

(52) U.S. Cl.
USPC ..... 348/14.08; 340/435; 345/619; 348/14.01; 348/14.16; 348/47; 348/78; 348/169; 351/209; 356/237.5; 359/618; 382/115; 438/87

(58) Field of Classification Search
USPC ............. 340/435, 619; 348/14.01, 14.08, 348/14.1, 14.16, 47, 78, 169; 351/209; 382/115; 345/619; 356/237.5; 359/618; 438/87
See application file for complete search history.

(56) References Cited

U.S. PATENT DOCUMENTS

| | | | |
|---|---|---|---|
| 5,400,069 A | 3/1995 | Braun et al. | |
| 5,500,671 A | 3/1996 | Andersson et al. | |
| 5,666,155 A * | 9/1997 | Mersereau | 348/14.16 |
| 6,385,352 B1 | 5/2002 | Roustaei | |
| 6,567,116 B1 * | 5/2003 | Aman et al. | 348/169 |
| 6,710,797 B1 * | 3/2004 | McNelley et al. | 348/14.16 |
| 6,771,303 B2 * | 8/2004 | Zhang et al. | 348/14.16 |
| 6,784,916 B2 * | 8/2004 | Smith | 348/14.01 |
| 6,894,839 B2 * | 5/2005 | Sugiyama et al. | 359/618 |
| 6,919,907 B2 * | 7/2005 | Berstis | 345/619 |
| 7,034,866 B1 | 4/2006 | Colmenarez et al. | |
| 7,050,084 B1 * | 5/2006 | Lang | 348/14.16 |
| 7,057,637 B2 * | 6/2006 | White | 348/14.16 |
| 7,202,887 B2 * | 4/2007 | Hillis et al. | 348/14.16 |
| 7,209,160 B2 * | 4/2007 | McNelley et al. | 348/14.16 |
| 7,602,276 B2 * | 10/2009 | Madau | 340/435 |
| 7,679,639 B2 * | 3/2010 | Harrell et al. | 348/14.08 |
| 7,692,680 B2 * | 4/2010 | Graham et al. | 348/14.01 |
| 7,692,780 B2 * | 4/2010 | Oomori et al. | 356/237.5 |
| 7,710,448 B2 * | 5/2010 | De Beer et al. | 348/14.01 |
| 7,763,546 B2 | 7/2010 | Kothari et al. | |
| 7,808,540 B2 | 10/2010 | Cok | |

(Continued)

OTHER PUBLICATIONS

Bolle; U.S. Appl. No. 12/238,096; "Videoconferencing Terminal and Method of Operation Thereof to Maintain Eye Contact"; filed Sep. 25, 2008.

(Continued)

*Primary Examiner* — Gerald Gauthier

(74) *Attorney, Agent, or Firm* — Hitt Gaines, PC

(57) ABSTRACT

The disclosure provides apparatuses for videoconferencing and a method of operation thereof. In one embodiment, an apparatus includes: (1) a display substrate occupying less than an entirety of a viewing area, (2) an actuator configured to move the display substrate over the viewing area and (3) a camera having a field of view at least partially overlapping the viewing area and configured to capture a camera image through the viewing area.

20 Claims, 7 Drawing Sheets

(56) References Cited

U.S. PATENT DOCUMENTS

| | | | |
|---|---|---|---|
| 8,063,929 B2* | 11/2011 | Kurtz et al. | 348/14.08 |
| 8,096,660 B2* | 1/2012 | Vertegaal et al. | 351/209 |
| 8,154,582 B2 | 4/2012 | Border et al. | |
| 8,223,186 B2* | 7/2012 | Derocher et al. | 348/14.01 |
| 8,228,371 B2* | 7/2012 | Sobel et al. | 348/47 |
| 8,253,770 B2* | 8/2012 | Kurtz et al. | 348/14.01 |
| 8,264,518 B2* | 9/2012 | Khouri et al. | 348/14.08 |
| 8,279,262 B2* | 10/2012 | Graham et al. | 348/14.1 |
| 2003/0197779 A1* | 10/2003 | Zhang et al. | 348/14.16 |
| 2004/0196359 A1* | 10/2004 | Blackham | 348/14.08 |
| 2006/0007222 A1 | 1/2006 | Uy | |
| 2006/0204050 A1* | 9/2006 | Takizawa | 382/115 |
| 2007/0002130 A1 | 1/2007 | Hartkop | |
| 2007/0120879 A1 | 5/2007 | Kanade et al. | |
| 2007/0247417 A1 | 10/2007 | Miyazaki et al. | |
| 2007/0263080 A1* | 11/2007 | Harrell et al. | 348/14.08 |
| 2007/0273839 A1 | 11/2007 | Doi et al. | |
| 2008/0012936 A1 | 1/2008 | White | |
| 2009/0041298 A1 | 2/2009 | Sandler et al. | |
| 2009/0122572 A1 | 5/2009 | Page et al. | |
| 2009/0278913 A1* | 11/2009 | Rosenfeld et al. | 348/14.16 |
| 2010/0073456 A1 | 3/2010 | Bolle | |
| 2010/0302343 A1 | 12/2010 | Bolle | |
| 2011/0043617 A1* | 2/2011 | Vertegaal et al. | 348/78 |
| 2011/0102538 A1* | 5/2011 | Tan | 348/14.08 |
| 2011/0137693 A1 | 6/2011 | Mattimore et al. | |
| 2011/0149012 A1* | 6/2011 | Bolle et al. | 348/14.08 |
| 2012/0040490 A1* | 2/2012 | Gallazzo et al. | 438/87 |

OTHER PUBLICATIONS

Bolle; U.S. Appl. No. 12/472,250; "Videoconferencing Terminal and Method of Operation Thereof to Maintain Eye Contact"; filed May 26, 2009.

M. Gross et al, "blue-c: A Spatially Immersive Display and 3D Video Portal for Telepresence", project webpage: http://bluec.ethz.ch/, ACM 0730-0301/03/0700-0819, (2003), pp. 819-827.

M. Kuechler et al, "Holoport—A Device for Simultaneous Video and Data Conferencing Featuring Gaze Awareness", In Proceedings of the 2006 IEEE Virtual Reality Conference (VR '06), (2006) pp. 81-87.

S. Izadi et al, "Going Beyond the Display: A Surface Technology with an Electronically Switchable Diffuser", UIST '08, (Oct. 19-22, 2008), Monterey, CA, pp. 269-278.

H. Ishii et al, "ClearBoard: A Seamless Medium for Shared Drawing and Conversation with Eye Contact", CHI '92, (May 3-7, 1992), pp. 525-532.

K-H Tan et al, "ConnectBoard: A remote collaboration system that supports gaze-aware interaction and sharing", 2009 IEEE International Workshop on Multimedia Signal Processing, MMSP '09, (Oct. 5-7, 2009), 6 pages.

S. Shiwa et al, "A Large-Screen Visual Telecommunication Device Enabling Eye Contact", SID 91 Digest, ISSN0097-0966x/91/0000-327 (1991), pp. 327-328.

C. Bolle, "VideoConferencing Terminal and Method of Operation Thereof to Maintain Eye Contact", Filing Date: May 26, 2009, U.S. Appl. No. 12/472,250, 25 pages.

C. Bolle et al, "Imaging Terminal", Filing Date: Dec. 8, 2009, U.S. Appl. No. 12/633,656, 21 pages.

C. Bolle, "VideoConferencing Terminal and Method of Operation Thereof to Maintain Eye Contact", Filing Date: Sep. 25, 2008, U.S. Appl. No. 12/238,096, 35 pages.

"How Mirasol® Displays Work: Micro-electro-mechanical Systems (MEMS) Drive IMOD Reflective Technology", www.mirasolidisplays.com/mobile-display-imod-technolgy.php?, 2009 Qualcomm MEMS Technologies, Inc., 1 page.

"TFT LCD Specification—Model No. PQ 3Q1-01", Doc No. PQ003, Pixel Qi Corporation, Jun. 28, 2010, 23 pages.

* cited by examiner

VIDEOCONFERENCING TERMINAL WITH A PERSISTENCE OF VISION DISPLAY AND A METHOD OF OPERATION THEREOF TO MAINTAIN EYE CONTACT

CROSS REFERENCE TO RELATED DISCLOSURE

This application is related to co-pending U.S. patent application Ser. No. 12/238,096, filed by Cristian A. Bolle on Sep. 25, 2008, entitled "Videoconferencing Terminal and Method of Operation Thereof to Maintain Eye Contact" and to co-pending U.S. patent application Ser. No. 12/472,250, filed by Cristian A. Bolle on May 26, 2009, entitled "Videoconferencing Terminal and Method of Operation Thereof to Maintain Eye Contact." Both applications are incorporated herein by reference in their entirety.

TECHNICAL FIELD

The disclosure is directed, in general, to videoconferencing terminals.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Communication via computer networks frequently involves far more than transmitting text. Computer networks, such as the Internet, can also be used for audio communication and visual communication. Still images and video are examples of visual data that may be transmitted over such networks.

One or more cameras may be coupled to a personal computer (PC) to provide visual communication. The camera or cameras can then be used to transmit real-time visual information, such as video, over a computer network. Dual transmission can be used to allow audio transmission with the video information. Whether in one-to-one communication sessions or through videoconferencing with multiple participants, participants can communicate via audio and video in real time over a computer network (i.e., voice-video communication). Typically the visual images transmitted during voice-video communication sessions depend on the placement of the camera or cameras.

SUMMARY

One aspect provides an apparatus. In one embodiment, the apparatus includes: (1) a display substrate occupying less than an entirety of a viewing area, (2) an actuator configured to move the display substrate over the viewing area and (3) a camera having a field of view at least partially overlapping the viewing area and configured to capture a camera image through the viewing area.

In another aspect, a method of videoconferencing is disclosed. In one embodiment, the method includes: (1) moving a display substrate over a viewing area, the display substrate occupying less than an entirety of the viewing area and (2) capturing a camera image through the viewing area, the camera having a field of view at least partially overlapping the viewing area.

In yet another aspect, another apparatus is provided. In one embodiment, this apparatus includes a first videoconferencing terminal connectable to support a videoconferencing session video with a second videoconferencing terminal via a telecommunications network, wherein the first terminal includes: (1) a display substrate occupying less than an entirety of a viewing area, (2) an actuator configured to move the display substrate over the viewing area and (3) a camera having a field of view at least partially overlapping the viewing area and configured to capture a camera image through the viewing area.

BRIEF DESCRIPTION

Reference is now made to the following descriptions taken in conjunction with the accompanying drawings, in which.

DETAILED DESCRIPTION

Figure 1:
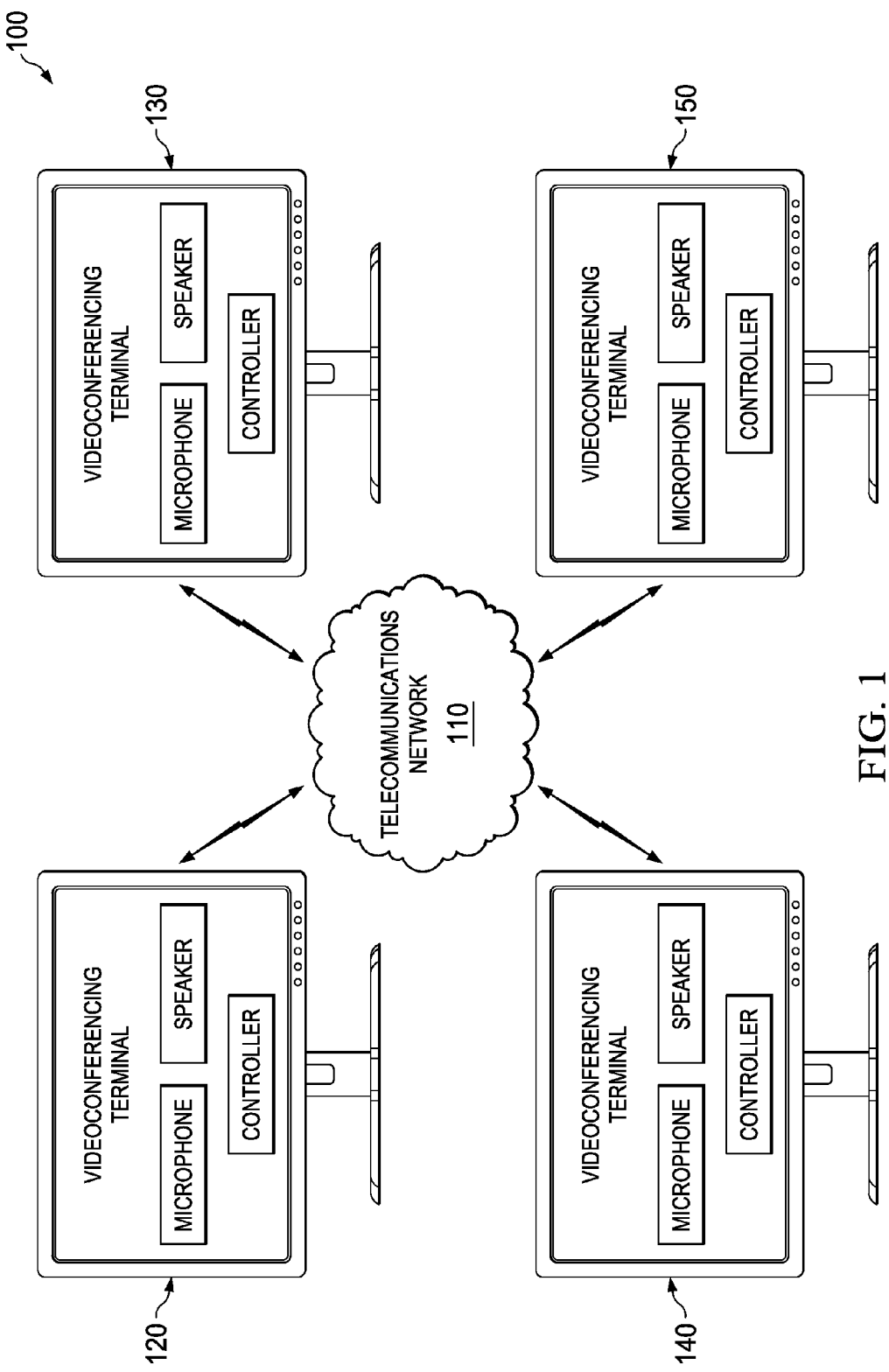
FIG. 1 is a schematic block diagram of an embodiment of a videoconferencing infrastructure within which a videoconferencing terminal constructed according to the principles of the disclosure may operate.

In a videoconferencing terminal, establishing eye contact between the participants greatly enhances the feeling of intimacy. Unfortunately, the display and camera in many conventional videoconferencing terminals are not aligned. The resulting parallax prevents eye contact from being established between participants of the videoconference.

Some videoconferencing terminals address the eye contact problem by using a large, tilted two way mirror to superimpose the camera position with the center of the display. Regrettably, this approach is bulky, frustrating the modern trend toward flat displays. Other videoconferencing terminals employ digital image-based rendering to recreate a central, eye contact view from multiple side views. For example, some videoconferencing terminals digitally shift the position of the pupils in each video frame to give the impression of real eye contact. One disadvantage of this approach is that it requires multiple cameras, significant image processing power and often yields unnatural results.

Disclosed herein are embodiments of an apparatus, such as a videoconferencing terminal, having a "persistence of vision" display that is used in combination with a camera located behind the display to simultaneously show an image of a remote video conference participant and capture an image of a local video conference participant. The disclosed embodiments, therefore, provide videoconferencing terminals that allow eye contact between participants during a videoconference. The videoconferencing terminals can display an image by employing an array of electronic light sources (e.g., red, green and blue light-emitting diodes (LEDs)) spun at a speed large enough such that the human eye can not follow the motion and will see a continuous image. If the electronic light sources are modulated in a synchronized way at even higher speed, an image can be displayed. For example, the electronic light sources may be rotated at a speed for an image repetition of 60 Hz and modulated at a speed of 1 MHz. A camera can then be located behind the electronic light sources that allows a video conference participant to establish eye contact by looking through the front of the terminal to the camera instead of, for example, looking at a camera mounted on the top or side of the terminal.

Disclosed herein, a display substrate is used to provide a persistence of vision display. The shape or type of display substrate may vary and may be based on the geometry of the viewing area of a particular videoconferencing terminal. In one embodiment, the display substrate includes a wheel with one or more vanes (or arms) extending from a center. The wheel is configured to carry on the front of each arm a necessary array of electronic light sources to accurately display an image while the structure is rotated by an actuator (e.g., a motor that may be centrally mounted with respect to a viewing area). As indicated above, an image repetition rate of 60 Hz may be used with the image repetition rate needing to be greater than 30 Hz. For a single arm at 30 Hz, the rotation speed of the arm translates to 1800 RPM. The rotation speed can be reduced proportionally to the number of arms that may be used to provide the display. An image repetition rate greater than a 100 Hz can be used to provide a higher quality display.

Any additional electronics needed to drive the electronic light sources can be advantageously mounted on the back of each arm and out of sight from a local participant. Power to drive the electronic light sources may be transferred over the shaft of the motor by a set of brushes. A video signal can be transmitted over a set of brushes or transmitted wirelessly to the spinning wheel. A position detector can be used to synchronize the rendered image with the wheel position.

The display substrate can provide images of a remotely located videoconference participant while a camera (e.g., a video camera) mounted behind the spinning wheel captures images of a local videoconference participant through the open areas in the spinning wheel. By having the camera located behind the display substrate and looking therethrough, both videoconference participants can establish eye contact and enhance the feeling of intimacy in the communication. To reduce spurious reflections or colors, substantial areas of the device can be painted or coated with light absorbing materials (black) or made of transparent and non-reflecting materials.

In some embodiments, a human interface may also be employed with the video conferencing terminal. As such, video conference participants could be able to draw on a screen or have a number of applications available that can be launched and shared with the other videoconference participant. Accordingly, an array of photodetectors may be included on the arm that scans a substantially transparent substrate (e.g., a glass window) located in the front of the videoconferencing terminal. The photodetectors can see the changes in the glass as a finger touches it. It will also be able to detect multiple fingers touching the glass at the same time. The detectors could be infrared detectors that would not be affected by ambient or displayed light. Additional infrared light sources may be located on the arm of the display substrate or the edge of the glass to act as sources for the detectors.

FIG. 1 is a schematic block diagram of one embodiment of a videoconferencing infrastructure 100 within which a videoconferencing terminal constructed according to the principles of the disclosure may operate. This embodiment of the videoconferencing infrastructure 100 is centered about a telecommunications network 110 that is employed to interconnect two or more videoconferencing terminals 120, 130, 140, 150, for communication of video signals or information, and perhaps also audio signals or information, therebetween. An alternative embodiment of the videoconferencing infrastructure 100 is centered about a computer network, such as the Internet. Still another embodiment of the videoconferencing infrastructure 100 involves a direct connection between two videoconferencing terminals, e.g., connection of the videoconferencing terminals 120, 130, via a plain old telephone (POTS) network. As represented in the videoconferencing terminal 120, the videoconferencing terminals 120, 130, 140, 150, may include components typically included in a conventional videoconferencing terminal, such as, a microphone, a speaker and a controller. The microphone can be configured to generate an audio signal based on acoustic energy received thereby, and the speaker can be configured to generate acoustic energy based on an audio signal received thereby.

Figure 2A:
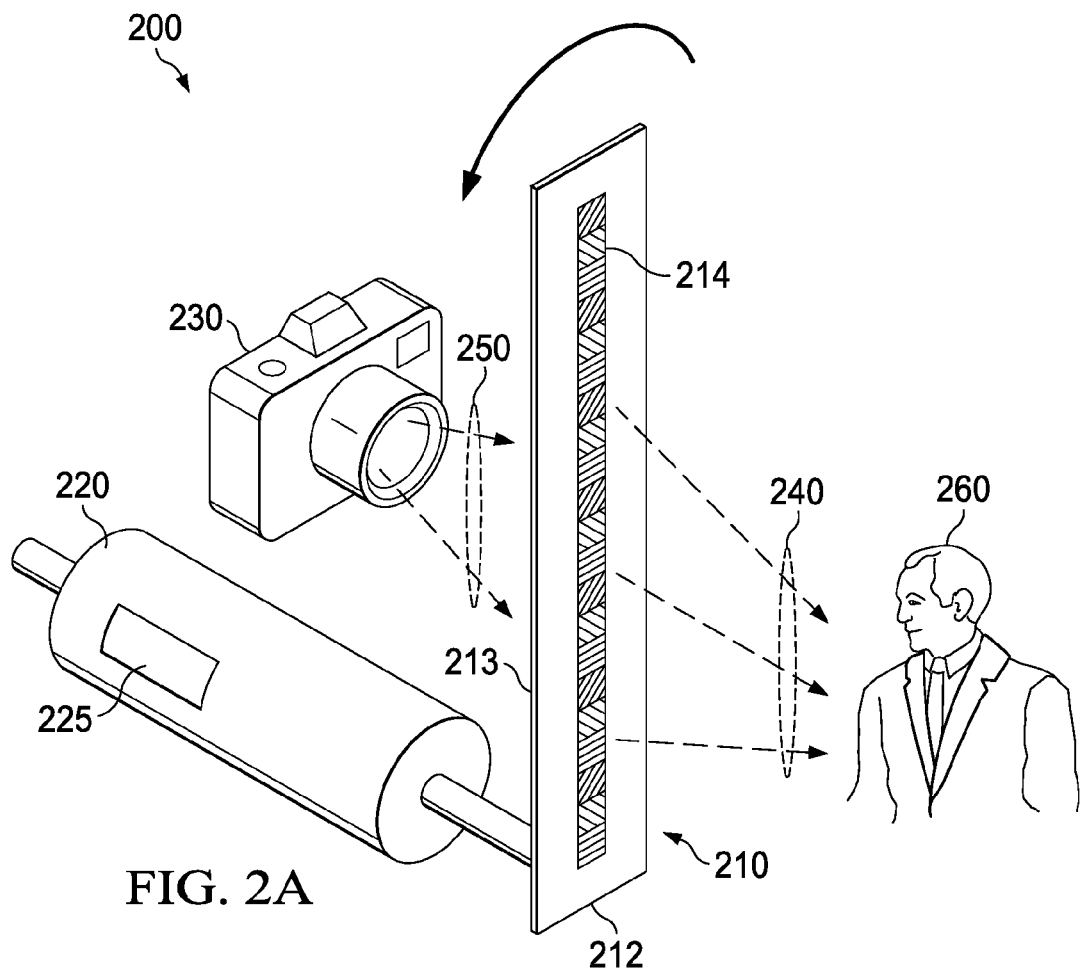
FIG. 2A and FIG. 2B are side elevation views of an embodiment of a videoconferencing terminal, e.g., of the videoconferencing infrastructure of FIG. 1, constructed according to the principles of the disclosure.
Figure 2B:
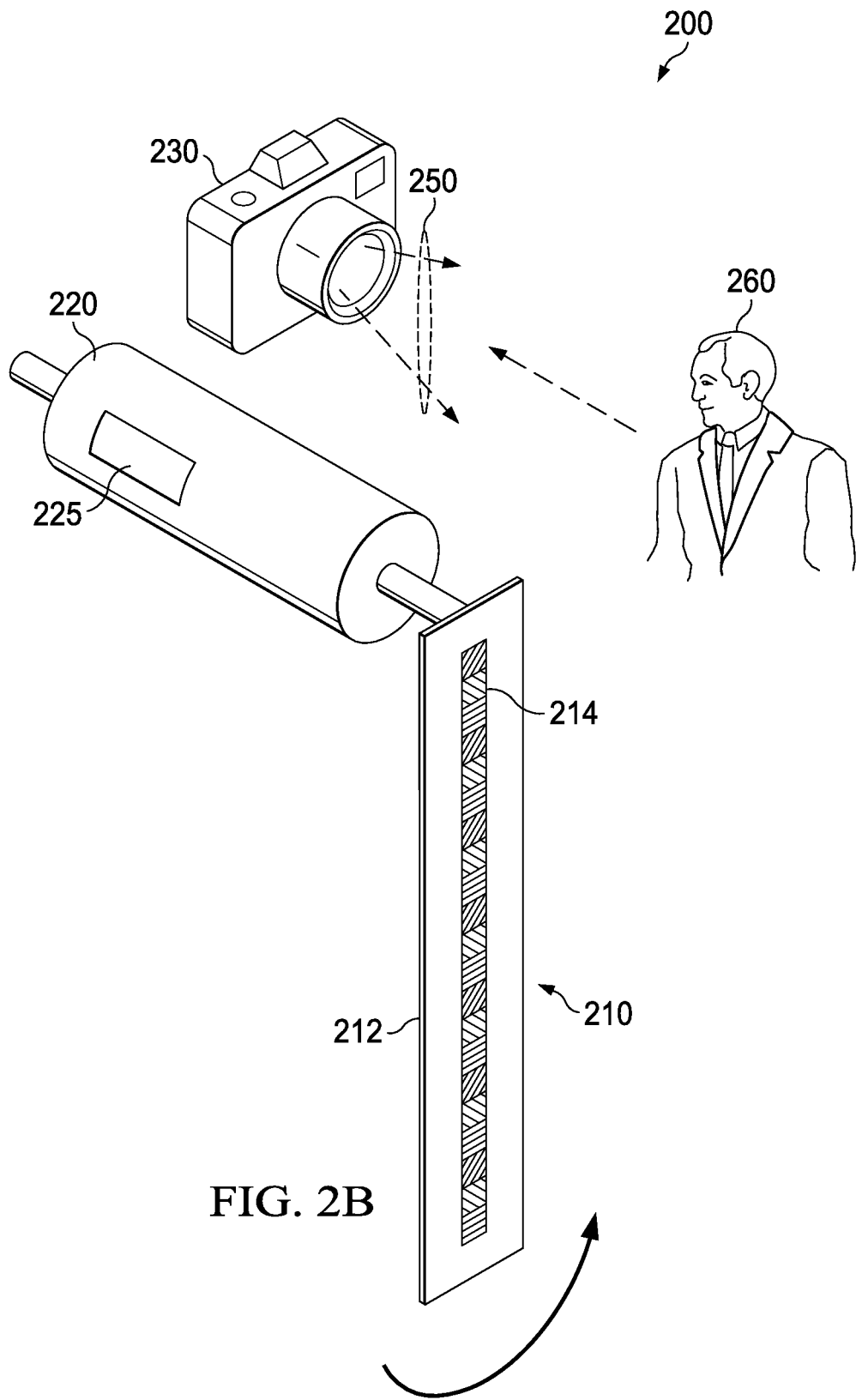

FIG. 2A and FIG. 2B are side elevation views of an embodiment of a videoconferencing terminal 200, e.g., of the videoconferencing infrastructure of FIG. 1, constructed according to the principles of the disclosure. The videoconferencing terminal 200 is configured to simultaneously capture a camera image and provide a display image. The videoconferencing terminal 200 includes a display substrate 210, an actuator 220 and a camera 230. Additionally, the videoconferencing terminal 200 may include additional components typically included in a conventional videoconferencing terminal. For example, the videoconferencing terminal 200 may include a microphone, a speaker and a controller that directs the operation of the videoconferencing terminal 200. The microphone and speaker may be associated with the controller. In some embodiments, the videoconferencing terminal 200 may include a section that is partially evacuated volume in which the display substrate 210 operates.

The display substrate 210 includes a substrate 212 having an array of electronic light sources 214 located thereon. The array 214 may be a single column array as illustrated or may include multiple columns. The array of electronic light sources 214 is sized to provide a persistence of vision display in a viewing area 240 when the display substrate 210 is moved over the viewing area 240. As such, the number of rows of the array of electronic light sources 214 may be equivalent or substantially equivalent to the radius (r) of the viewing area 240. The viewing area 240 may coincide with a substantial transparent substrate that is placed in front of the videoconferencing terminal 200 (i.e., opposite side of the display substrate 210 from the camera 230). The display substrate 210 occupies less than an entirety of the viewing area 240. Thus, the display substrate 210 is smaller than the viewing area 240. Accordingly, persistence of vision is relied on to provide a display image for the videoconferencing terminal 200.

The videoconferencing terminal 200 also includes electronic circuitry 213 coupled to the array of electronic light sources 214. The electronic circuitry 213 is configured to control the array of electronic light sources 214 to form the display image. The electronic circuitry 213 may be located on an opposing surface of the substrate 212 from the array of electronic light sources 214 as illustrated in FIG. 2A. As such, the electronic circuitry 213 is not visible in the illustrated embodiment.

The electronic circuitry 213 is configured to direct the operation of each of the electronic light sources of the array 214. The electronic circuitry 213 may be partially or totally incorporated in the substrate 212. In other embodiments, the electronic circuitry 213 for the electronic light sources 214 may be formed on a separate substrate from the substrate 212. The electronic circuitry 213 may include a matrix of thin film transistors (TFT) with each TFT driving and/or controlling a particular electronic light source of the array 214. The electronic circuitry 213 may include components typically employed in a conventional array-type active backplane. In one embodiment, the electronic circuitry 213 may operate similar to an active backplane employed in a conventional LED display. Power to drive the electronic light sources 214 (and the electronic circuitry 213) may be transferred over a shaft of the actuator by a set of mechanical brushes. Additionally, power to drive the electronic circuitry 213, the electronic light sources 214 or other electronics associated therewith can also be transferred to the substrate 212 through magnetic induction. Also, the power transfer function can be shared or combined with the actuator function by reusing coils located on the display substrate 210 or inside the actuator 220. A display signal representing the display image, such as a video signal, can also be transmitted over a set of brushes of the actuator 220 to the electronic circuitry 213. In some embodiments, the electronic circuitry 213 may include a wireless transceiver and the display signal may be transmitted wirelessly to the display substrate 210 and the electronic circuitry 213 located thereon.

The electronic circuitry 213 may cooperate with a position detector 225 to provide the display image. The position detector 225 is configured to generate electrical signals indicating a position of the display substrate 210 that the electronic circuitry may use to synchronize the display image with the position of the display substrate 210. The position detector 225 may generate the electrical signals based on polar or Cartesian coordinates that represent the location of the display substrate 210. The type of coordinates that are used may be based on the geometry of the viewing area 240. The position detector 225 may be electrically coupled to the actuator 220 and the display substrate 210. As illustrated, the position detector 225 may be mechanically coupled to the actuator 220. One skilled in the art will understand the operation and configuration of the position detector 225 and that the location of the position detector 225 may vary in different embodiments. In one embodiment, the position detector 225 may be a magnetic Hall sensor. In another embodiment, an optical detector, such as used on encoder wheels, may be used as a position detector.

The position detector 225 may be coupled to the electronic circuitry 213 and configured to transmit the position signals thereto. The electronic circuitry 213 may then employ the position signals to control the array of electronic light sources 214 to provide the display image in the viewing area 240. The electronic circuitry 213, therefore, may employ the position signals to synchronize the display signals to provide the displayed image.

The arrows emanating from the array of electronic light sources 214 represent the displayed image that is provided within the viewing area 240. The displayed image may be in color or in black and white. In one embodiment, each electronic light source of the array 214 may represent a single pixel that is displayed in the viewing area 240. In other embodiments, multiple electronic light sources may represent a pixel. In some embodiments, the array of electronic light sources 214 may be an array of LEDs. In other embodiments, the LEDs may be organic LEDs (OLEDS). The array of electronic light sources 214 may be an array of LEDs configured to transmit light of three different colors, such as red, blue and green. In an alternative embodiment, the array of electronic light sources 214 may be other light-emitting pixels that are used in other conventional terminals or later-developed technology. For example, liquid crystals may be used such as those used in a liquid crystal display (LCD). Those skilled in the pertinent art understand the structure and operation of conventional videoconferencing terminals and the light-emitting pixels that are used to display images.

The actuator 220 is configured to move the display substrate 210 over the viewing area 240. The actuator 220 may be a motor that rotates the display substrate 210 over the viewing area 240. The actuator 220 is configured to move the display substrate 210 at a speed sufficient to present a display image as persistent to a human eye. In some embodiments, the actuator 220 is configured to move the display substrate 210 over the entirety of the viewing area 240. The viewing area 240 is the area defined by the persistence of vision display generated from moving the display substrate 210. An entirety of the viewing area 240 is the total area defined by the persistence of vision display. For example, if a viewing area is circular, the entirety of the viewing area is the area within the circumference of the circle.

The camera 230 is configured to capture a camera image. The camera 230 may be for color images or black and white images. The camera 230 may be a video camera. Though FIG. 2 only schematically represents the camera 230, the camera 230 may take the form of an array-type charge-coupled device (CCD) solid-state camera equipped with a lens allowing it to capture an image from a focal plane that is beyond the viewing area 240. Those skilled in the art will recognize that the camera 230 may be of any conventional or later-developed camera. Those skilled in the pertinent art also understand the structure and operation of such cameras, e.g., a conventional camera used in a videoconferencing terminal. The camera 230 may include circuitry and or software for processing of captured images. Accordingly, the camera 230 may be configured to perform post-processing of the captured images to increase clarity.

The camera 230 has a field of view 250 that at least partially overlaps the viewing area 240 and is configured to capture the camera image through the viewing area 240. In some embodiments, the camera 230 captures the camera image during a time when the actuator 220 moves the display substrate 210 outside of the field of view 250. The camera 230 can also capture a camera image while the field of view 250 is partially blocked. For example, in FIG. 2A, the field of view 250 is at least partially blocked by the display substrate 210 and the camera 230 would capture a partially blocked camera image. In FIG. 2B, the display substrate 210 has been moved out of the field of view 250 by the actuator 220. Accordingly, the camera 230 is able to capture the camera image without blockage from the display substrate 210. The camera image includes an object 260 that is on the front side of the videoconferencing terminal 200, i.e., the side of the display substrate 210 that is opposite the camera 230. In the illustrated embodiment, the object 260 includes a face of a participant in a videoconference. However, the object 260 may be any object whatsoever. The arrow emanating from the object 260 represents light that is received by the camera 230 within the field of view 250.

Figure 3:
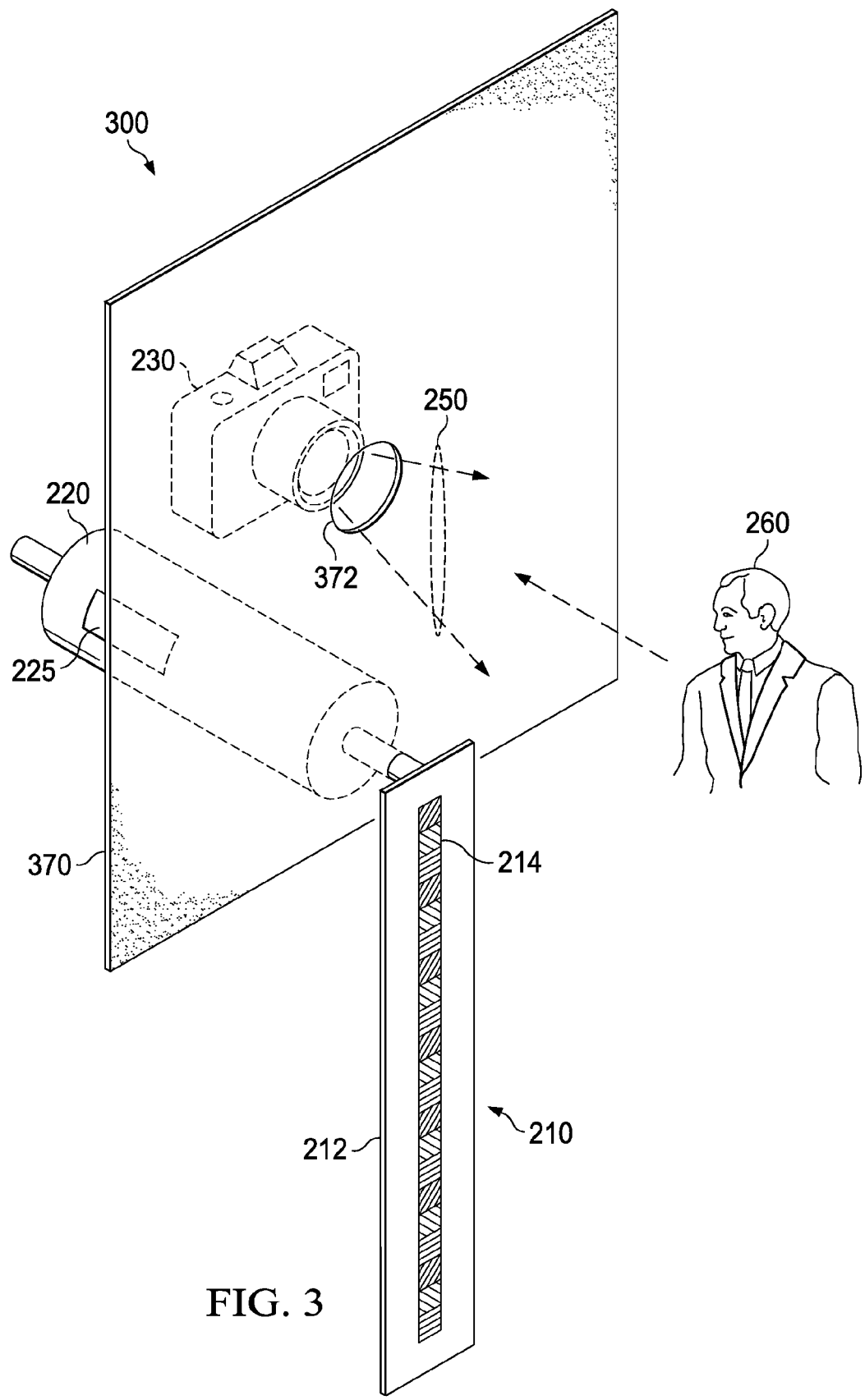
FIG. 3 is a side elevation view of another embodiment of a videoconferencing terminal constructed according to the principles of the disclosure.

FIG. 3 is a side elevation view of another embodiment of a videoconferencing terminal 300 constructed according to the principles of the disclosure. In FIG. 3, the videoconferencing terminal 300 includes components of the videoconferencing terminal 200 as indicated by the same element numbers. Additionally, the videoconferencing terminal 300 also includes a light-absorbing substrate 370. The light-absorbing substrate 370 is positioned between the display substrate 210 and the camera 230 to reduce spurious reflections or colors.

The light-absorbing substrate 370 includes at least one opening 372 that is positioned with respect to the camera 230 to allow the field of view 250 to pass therethrough. Accordingly, the light-absorbing substrate 210 is positioned to hide the actuator 230 and most of the camera 230 from view via the frontside of the videoconferencing terminal 300. As illustrated, the opening 372 is positioned with respect to the lens of the camera 230. In other embodiments, the light-absorbing substrate 370 may include multiple openings that correspond to multiple lenses of the camera 230.

The light-absorbing substrate 370 is constructed of a light-absorbing material. In some embodiments, the light-absorbing substrate 370 may be a black substrate. In alternative embodiments, areas of the videoconferencing terminal 300 that are not to be seen can be painted or coated with a light absorbing material to reduce spurious reflections or colors. In some embodiments, portions of the videoconferencing terminal 300 that should not be visible, for example, the actuator 220, may be constructed of transparent of non-reflecting materials.

Figure 4:
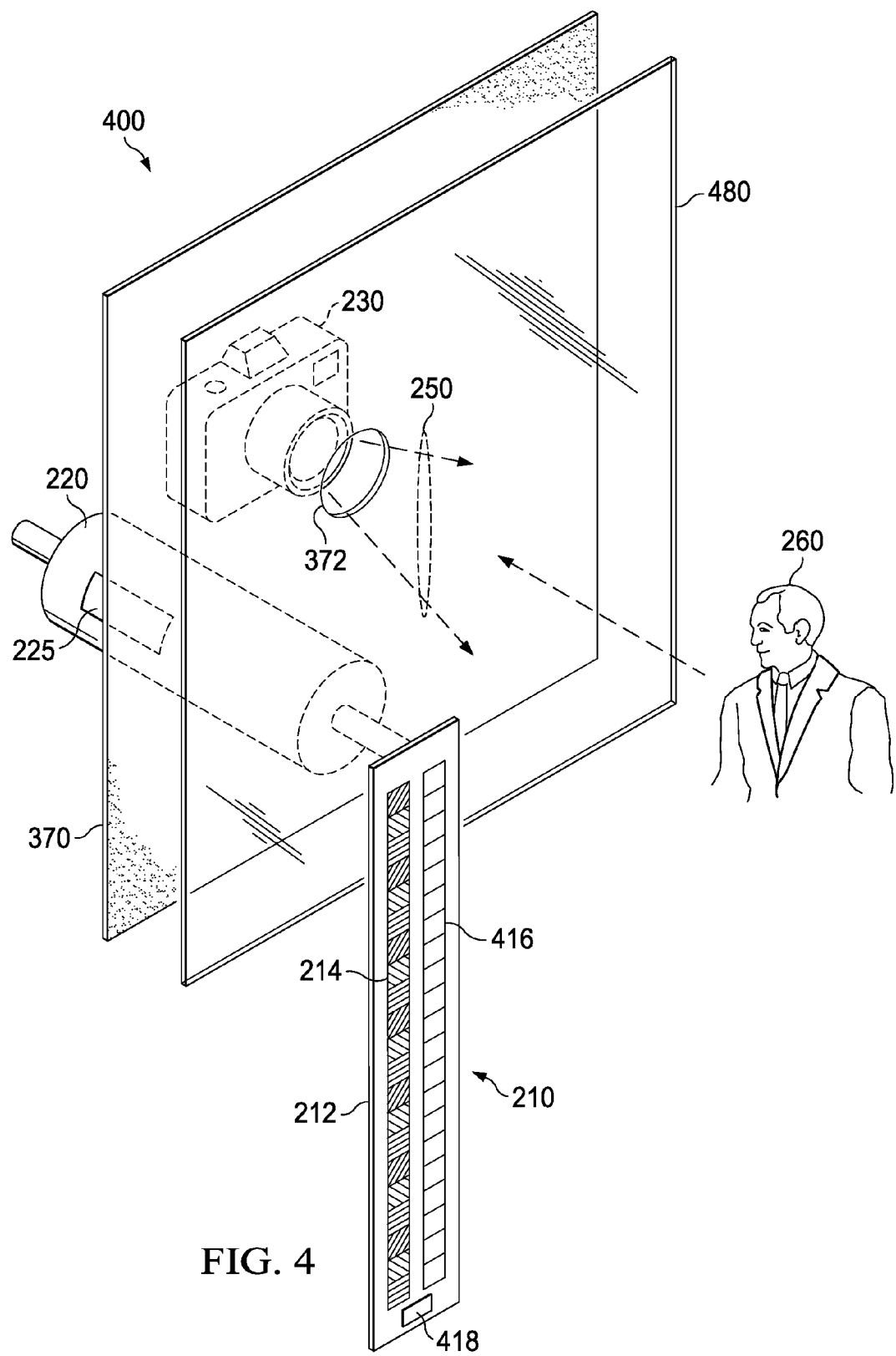
FIG. 4 is a side elevation view of yet another embodiment of a videoconferencing terminal constructed according to the principles of the disclosure.

FIG. 4 is a side elevation view of yet another embodiment of a videoconferencing terminal 400 constructed according to the principles of the disclosure. In FIG. 4, the videoconferencing terminal 400 includes components of the videoconferencing terminal 300 as indicated by the same element numbers. Additionally, the videoconferencing terminal 400 also includes a substantially transparent substrate 480 and the display substrate 210 includes an array of photodetectors 416 configured to detect touching of the substantially transparent substrate 480. The substantially transparent substrate 480 protects the videoconferencing terminal 400 and the user, i.e., the object 260 in FIG. 4, during operation. The substantially transparent substrate 480, for example, may be glass. In other embodiments, the substantially transparent substrate 480 may be another substrate that is transparent to visible light or is transparent to one or more frequency segments of the visible light spectrum.

The array of photodetectors 416 can be used to scan the surface of the substantially transparent substrate 480. If a person touches the substantially transparent substrate 480, the array of photodetectors 416 can identify the touching finger(s) position. The array of photodetectors 416 can scan the substantially transparent substrate 480 when the display substrate is being moved by the actuator 220. The array of photodetectors 416 can be used as a human interface. The array of photodetectors 416 may include infrared or visible photodetectors. In some embodiments, an infrared light source(s) 418 may also be placed on the display substrate 210 or the edge of the substantially transparent substrate 480 to provide a light source for the array of photodetectors 416. The electronic circuitry 213 may be configured to direct the operation of the array of photodetectors 416.

Figure 5A:
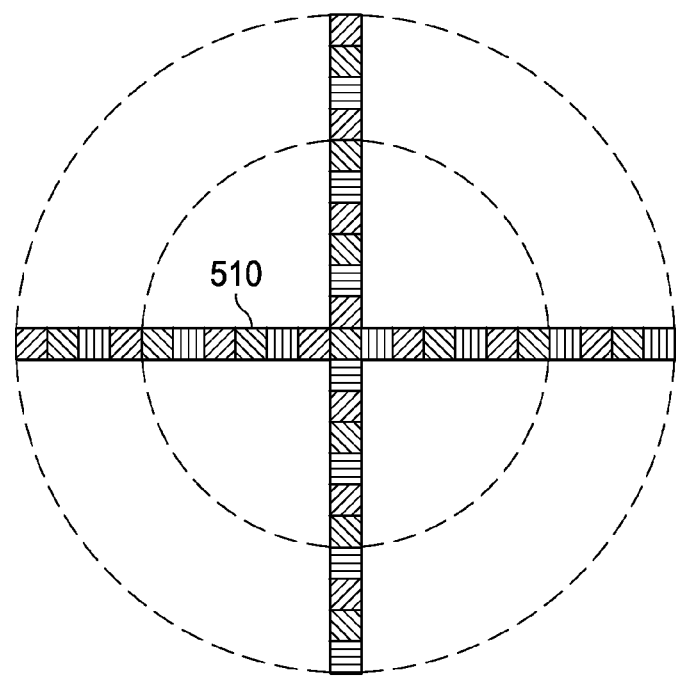
FIG. 5A and FIG. 5B are front elevation views of other embodiments of a display substrate constructed according to the principles of the disclosure.
Figure 5B:
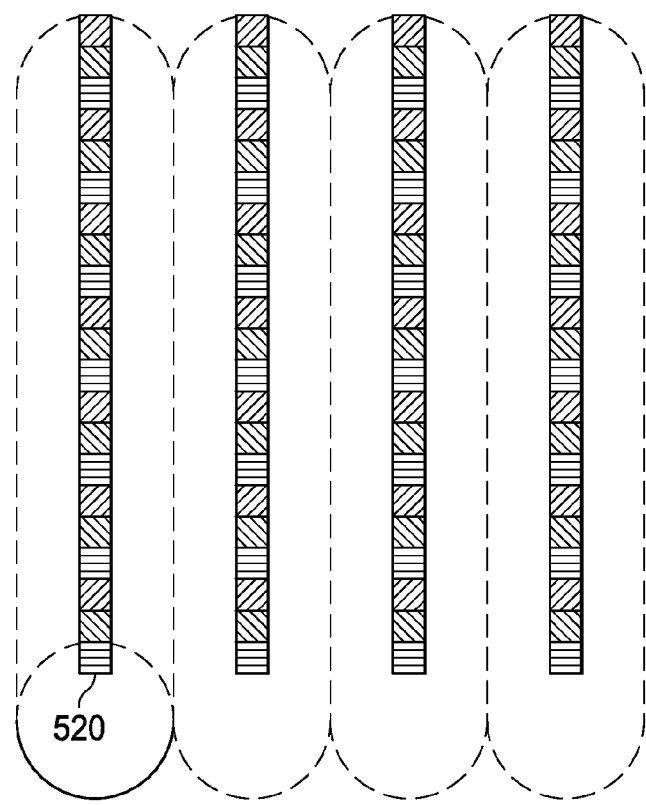

FIG. 5A and FIG. 5B are front elevation views of other embodiments of display substrates constructed according to the principles of the disclosure. FIGS. 5A and 5B illustrate that other geometries for a display substrate are possible. Two such examples are provided in FIG. 5A and FIG. 5B. Regardless of the geometries employed, the electronic light sources of the display substrates are positioned to cover the viewing area, e.g., the entirety of the viewing area, when moved.

FIG. 5A illustrates a display substrate 510 having multiple arms. Each of the multiple arms of the display substrate 510 may be moved by an actuator such as the actuator 220. As with the display substrate 210, the display substrate 510 may also be rotated by the actuator 220 to provide a display image in a circular coverage area. As such, the individual lights of the electronic light sources of the display substrate 510 have concentric trajectories (indicated by dashed lines) that provide the display image over a circular coverage area.

FIG. 5B illustrates a display substrate 520 that is not designed to spin like the display substrate 210 and 510, but is configured to move in a circular motion to cover a viewing area. The dashed lines in FIG. 5B represent the area covered by the array of electronic light sources of the display substrate 520. With this arrangement, the display substrate 520 may be used to cover a rectangular viewing area.

Figure 6:
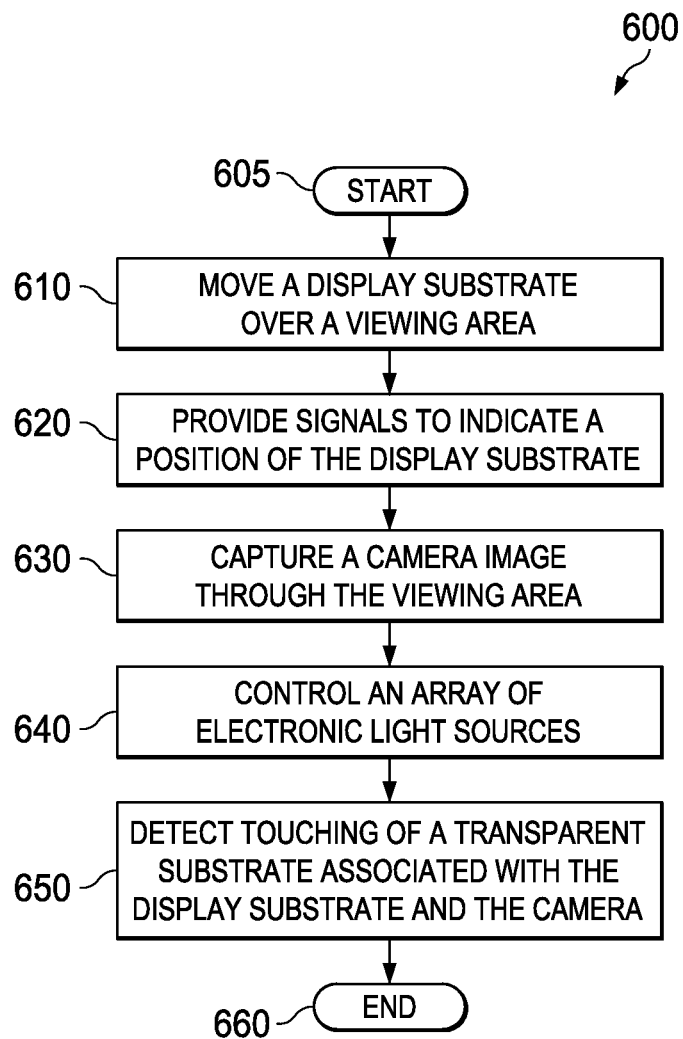
FIG. 6 is a flow diagram of one embodiment of a method of videoconferencing carried out according to the principles of the disclosure.

FIG. 6 is a flow diagram of one embodiment of a method 600 of videoconferencing carried out according to the principles of the disclosure. An apparatus as described herein may be used in the method 600. The method 600 begins in a step 605.

In a step 610, a display substrate is moved over a viewing area wherein the display substrate occupies less than an entirety of the viewing area. The display substrate includes an array of electronic light sources located thereon. The display substrate may include multiple substrates having a column of electronic light sources. In some embodiments, the display substrate may be configured to cover a circular viewing area. In other embodiments, the display substrate may be configured to cover a rectangular viewing area. In some embodiments, the display substrate is moved over the entirety of the viewing area. An actuator may be used to move the display substrate through the viewing area. In one embodiment, the actuator may be a motor that spins or rotates the display substrate.

Signals are provided in a step 620 to indicate a position of the display substrate. Polar coordinates or Cartesian coordinates may be used to indicate a position of the display substrate. Based on the position of the display substrate, the position of each pixel represented by the array of electronic light sources may also be determined since the location of each electronic light source of the array is known with respect to the display substrate. A position detector may be used to generate the position signals.

In a step 630, a camera image is captured through the viewing area. A field of view of the camera at least partially overlaps the viewing area. In some embodiments, the camera image may be captured through the viewing area during a time when the display substrate is outside of the field of view of the camera.

The array of electronic light sources is controlled in a step 640 employing electronic circuitry to form the display image. The electronic circuitry and the array of electronic light sources may be located on opposing surfaces of the substrate of the display substrate. The method 600 continues in a step 650 where touching of a transparent substrate associated with the movable display substrate and the camera is detected. An array of photodetectors may be used to detect when and where the transparent substrate is touched. Steps 640 and 650 may be performed in parallel. The method 600 ends in a step 660.

Those skilled in the art to which the application relates will appreciate that other and further additions, deletions, substitutions and modifications may be made to the described embodiments. Additional embodiments may include other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus, comprising:
a display substrate occupying less than an entirety of a viewing area;
an actuator configured to move said display substrate over said viewing area; and
a camera having a field of view at least partially overlapping said viewing area and configured to capture a camera image through said viewing area.

2. The apparatus as recited in claim 1 wherein said actuator is configured to move said display substrate at a speed sufficient to present a display image as persistent to a human eye.

3. The apparatus as recited in claim 1 wherein said display substrate includes an array of electronic light sources located thereon.

4. The apparatus as recited in claim 3 further comprising electronic circuitry coupled to, and capable of controlling, said array of electronic light sources to form said display image.

5. The apparatus as recited in claim 3 wherein said electronic light sources are light-emitting diodes configured to transmit light of three different colors.

6. The apparatus as recited in claim 1 further comprising a light-absorbing substrate positioned between said display substrate and said camera and having at least one opening, said field of view passing through said opening.

7. The apparatus as recited in claim 1 further comprising a position detector configured to provide signals indicating a position of said display substrate.

8. The apparatus as recited in claim 1 further comprising a transparent substrate, wherein said display substrate includes an array of photodetectors configured to detect touching of said transparent substrate.

9. A method of videoconferencing, comprising:
moving a display substrate over a viewing area, said display substrate occupying less than an entirety of said viewing area; and
capturing a camera image through said viewing area, said camera having a field of view at least partially overlapping said viewing area.

10. The method as recited in claim 9 wherein said moving occurs at a speed sufficient to present a display image as persistent to a human eye.

11. The method as recited in claim 9 wherein said display substrate includes an array of electronic light sources located thereon.

12. The method as recited in claim 11 further comprising controlling said array of electronic light sources, employing electronic circuitry, to form said display image.

13. The method as recited in claim 11 wherein said electronic light sources are light-emitting diodes configured to transmit light of three different colors.

14. The method as recited in claim 9 further comprising reducing reflections of light associated with said capturing.

15. The method as recited in claim 9 further comprising providing signals indicating a position of said display substrate.

16. The method as recited in claim 9 further comprising detecting touching of a transparent substrate associated with said movable display and said camera.

17. An apparatus, comprising:
a first videoconferencing terminal connectable to support a videoconferencing session video with a second videoconferencing terminal via a telecommunications network, wherein said first terminal includes:
a display substrate occupying less than an entirety of a viewing area;
an actuator configured to move said display substrate over said viewing area; and
a camera having a field of view at least partially overlapping said viewing area and configured to capture a camera image through said viewing area.

18. The apparatus as recited in claim 17 wherein said first terminal further comprises a light-absorbing substrate positioned between said display substrate and said camera and having at least one opening, said field of view passing through said opening.

19. The apparatus as recited in claim 17 wherein said first terminal further comprises a position detector configured to provide signals indicating a position of said display substrate.

20. The apparatus as recited in claim 17 wherein said first terminal further comprises a transparent substrate, wherein said display substrate includes an array of photodetectors configured to detect touching of said transparent substrate.

* * * * *